(12) United States Patent
Kurt-Elli

(10) Patent No.: US 7,328,621 B2
(45) Date of Patent: Feb. 12, 2008

(54) METHOD OF PROCESSING OSCILLATORY DATA

(75) Inventor: Hilmi Kurt-Elli, Derby (GB)

(73) Assignee: Rolls-Royce plc, London (GB)

( * ) Notice: Subject to any disclaimer, the term of this patent is extended or adjusted under 35 U.S.C. 154(b) by 208 days.

(21) Appl. No.: 11/181,835

(22) Filed: Jul. 15, 2005

(65) Prior Publication Data
US 2006/0041393 A1 Feb. 23, 2006

(30) Foreign Application Priority Data
Aug. 5, 2004 (GB) .................. 0417421.5

(51) Int. Cl.
G06F 17/10 (2006.01)
G06F 19/00 (2006.01)
G01M 15/14 (2006.01)

(52) U.S. Cl. ................ 73/660; 702/56; 702/198
(58) Field of Classification Search ............... 73/579, 73/587, 660; 702/56, 198
See application file for complete search history.

(56) References Cited
U.S. PATENT DOCUMENTS

| | | | |
|---|---|---|---|
| 3,710,082 A * | 1/1973 | Sloane et al. ............... 700/280 |
| 5,511,037 A * | 4/1996 | Randall et al. .............. 367/33 |
| 6,474,166 B1 | 11/2002 | Osawa et al. |
| 6,791,482 B2 * | 9/2004 | Koyanagi ................. 341/61 |
| 2002/0040278 A1 | 4/2002 | Anuzis et al. |
| 2003/0018928 A1 | 1/2003 | James et al. |

OTHER PUBLICATIONS

Allwood et al., "The automatic interpretation of vibration data from gas turbines," The Aeronautical Journal of the Royal Aeronautical Society, pp. 99-107, 1996.
Gersch et al., "Estimation of Stationary Structural System Parameters from Non-Stationary Random Vibration Data: A Locally Stationary Model Method," Journal of Sound and Vibration, vol. 81, pp. 215-227, Mar. 22, 1982.
J. S. Bendat et al. *Random Data: Analysis and Measurement Procedures*, pp. 82-85, 360-264, 1971.
Harrison et al., "Application of wavelet and Wigner analysis to gas turbine vibration signal processing," SPIE vol. 3391, pp. 490-497, 1998.

* cited by examiner

*Primary Examiner*—Hezron Williams
*Assistant Examiner*—Rose M Miller
(74) *Attorney, Agent, or Firm*—Oliff & Berridge, PLC (57) ABSTRACT

A method of processing oscillatory response data from a resonant system includes: obtaining data measuring an oscillatory response of the system at a plurality of evenly spaced time intervals; obtaining a plurality of reference frequencies from the data at a plurality of times in the data, each reference frequency preferably being the natural frequency of a mode of the response at the respective time or an estimate of the natural frequency; and transforming the data to an uneven data set having unevenly spaced time intervals by adjusting the evenly spaced time intervals according to the values of the measured reference frequencies. The method can transform non-stationary response data to make it effectively stationary, and thus in a more useful form for further analysis. A method of analysing a resonant system and an apparatus for processing oscillatory response data are also provided.

22 Claims, 11 Drawing Sheets

METHOD OF PROCESSING OSCILLATORY DATA

The present invention relates to a method of processing oscillatory data. It is particularly, but not exclusively, concerned with a method of processing oscillatory response data, and in particular non-stationary responses caused for example by a characteristic frequency of a system changing with time.

There are many situations where the response of a system, such as a gas turbine engine or a component thereof, which is subjected to random or engine order (EO) excitations, displays non-stationary characteristics. These may occur even where the excitation itself is reasonably stationary.

Random excitation data is normally considered stationary if statistical properties such as long time averaged root-mean-square level in a frequency band are constant with time. The non-stationary case can arise if the modal frequencies are changing with time.

Changes in modal frequency can occur for a variety of reasons. For example, in a gas turbine engine, these variations can be due to thermal and/or centripetal force stiffening. Within missile systems these variations may also be due to mass loss effects.

In mechanical systems, damping provides a measure of the energy dissipation capacity of a structure or system. The measurement of damping can be useful because it aids the understanding of the behaviour of a structure, and knowledge about the level of damping can be valuable in troubleshooting and assessment of potential and actual problem fixes. Damping can also be used to provide parameter values for and validation of models.

Changes in damping over time may be useful to indicate the "health" of a system, and can also be used to provide an indication of potential instability of a system such as "flutter".

However, it is difficult to determine the characteristics of a mode exhibiting such non-stationary behaviour, arising due to modal frequencies changing with time. For example it is problematic to determine the modal bandwidth or damping associated with the mode.

This difficulty arises because conventional analysis methods and systems do not adequately handle non-stationary data such as that discussed above, and therefore it is difficult to obtain accurate measurements of any of the above characteristics in systems displaying non-stationary characteristics.

In practice the most common approach used for dealing with non-stationary random response data at the moment is the segmented approach outlined in *Random Data: Analysis and Measurement Process* by J. S. Bendat and A. G. Piersol; *Wiley Interscience*, 1971.

The segmented approach splits the oscillatory response data into segments, each of which is considered to be stationary and therefore processed as such in the normal manner. The above reference describes why results from this approach should be treated with caution and may only be useful in a qualitative sense.

Specifically, a problem arises with the short time interval bias error arising from changes in the characteristics which occur within the period of an individual segment, e.g. if the modal frequency changes significantly relative to the modal bandwidth within a segment. In order to suppress the time interval bias error, a short averaging time (subrecord length) T is required, but to obtain the desired spectral decomposition, a narrow resolution bandwidth $B_e$ is required. The result is a relatively small $B_e \cdot T$ product and hence a large random error.

However, in many cases the requirement for adequate frequency resolution will mean that segment durations are long, with significant modal frequency changes relative to the modal bandwidth and therefore a serious bias occurs in the bandwidth or damping estimates.

Therefore the segmented approach is in principle problematic and in some situations may not even allow qualitative results to be obtained.

The present invention seeks to address some or all of the problems associated with the segmented approach.

In general terms, the present invention provides a method which permits the transformation of non-stationary response measurements into stationary data for analysis.

The present invention relates to oscillatory systems in general, but will be described and illustrated for oscillatory data which specifically describes vibration phenomena. Alternative applications of the invention, for example in electrical networks in which it is desired to determine the bandwidth when the characteristic frequency of the circuit is changing with time, are equally possible.

A first aspect of the present invention provides a method of processing oscillatory response data from a resonant system comprising:
  obtaining data measuring an oscillatory response of the system at a plurality of evenly spaced time intervals;
  obtaining a plurality of reference frequencies from said data at a plurality of times in said data;
  transforming said data to an uneven data set having unevenly spaced time intervals by adjusting said evenly spaced time intervals according to the values of said measured reference frequencies.

Preferably each reference frequency is the natural frequency of a mode of the response at the respective time or an estimate of said natural frequency.

Transforming the typically non-stationary oscillation data according to the method of the present aspect may make it effectively stationary, and thus in a more useful form for further analysis.

The step of obtaining the reference frequencies may include obtaining multiple Fourier transforms of the measured data, for example as described in "The automatic interpretation of vibration data from gas turbines", Allwood, King & Pitts, *The Aeronautical Journal of the Royal Aeronautical Society*, March 1996, the contents of which are incorporated by reference.

Alternatively to the methods described in this reference, the same zmod (waterfall or Campbell diagram) data containing the multiple Fourier transform data may be analysed to determine likely natural frequency values via a standard modal curve fitting approach and/or by manually cursoring likely estimates prior to conducting a least squares type fit to the data to determine a smooth time frequency profile.

Furthermore, model data or a combination of model data with experimental data may be used in the step of obtaining the reference frequencies.

When the data being processed comes from engines or, in particular, gas turbines, in many cases it will have arisen from conducting engine speed-up or slow-down tests in which the engine speed changes over a given time interval. Under these conditions it is common for the natural frequency variation with time to be approximated by a quadratic equation because of the long time constant associated with the thermal or centrifugal-force-stiffening effects causing the natural frequency changes. Higher degree polynomial approximations or other functional forms or numerically described profiles could also be used. Numerically described profiles could, for example, be obtained by tracking the peak on a running spectrum.

Preferably said step of transforming includes increasing or decreasing each evenly spaced time interval in proportion to the value of a corresponding one of said reference frequencies.

Preferably as many reference frequencies are obtained as there are evenly spaced time intervals in the data and more preferably each evenly spaced time interval has a different corresponding reference frequency.

The method of this aspect may also include the initial step of measuring the oscillatory response of the resonant system to obtain said data.

Another aspect of the present invention provides a method of analysing a resonant system comprising:

processing according to the above aspect; and
analysing the uneven data set to determine a characteristic of the system.

As a result of the transformation of the response data, analysis techniques may be used on the uneven data set to determine features of interest such as bandwidth and damping. When the data being analysed is effectively stationary, this analysis may be done with high frequency resolution and long averaging times, without bias errors resulting from natural frequency changes.

The step of analysing may include performing a Fourier analysis of the uneven data set.

The step of analysing may also include the step of sampling said uneven data set at a plurality of evenly spaced time intervals, i.e. sampling the uneven data set. In order to allow such sampling the step of analysing may further include the step of interpolating the uneven data set. Such re-sampling may allow standard analysis techniques to be used.

For example, the step of analysing may include determining a power spectral density (PSD) function of the re-sampled uneven data set.

Alternatively, if the input, which is driving the system, is known, a frequency response function computation may be conducted. Again due to the processing of the data, standard random data analysis techniques may be used.

Figure 11:
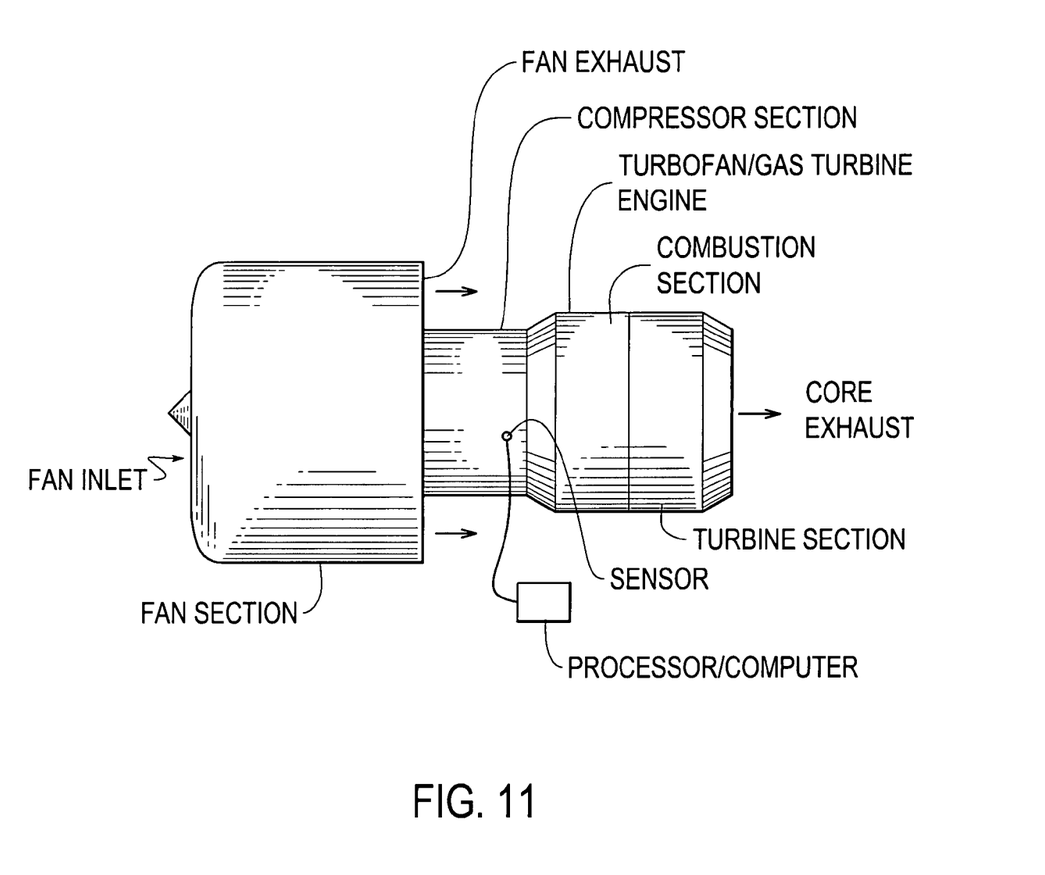
FIG. 11 shows the response signal processing method used in a mechanical system.

The system of either of the above aspects may be a model system. Alternatively the system of either of the above aspects may be a mechanical system such as a gas turbine engine or a component thereof, as illustrated in FIG. 11.

The methods of the previous aspects may conveniently be implemented in software, for execution on any appropriate digital computer. The software may also embody preferred or optional features of the methods of the previous aspects. The methods may be performed on-line, or off-line on stored measurement data.

Thus further aspects of the invention respectively provide a computer system operatively configured to implement any of the methods of the previous aspects of the invention; computer programming product or products (such as ROM, RAM, floppy discs, hard drives, optical compact discs, magnetic tapes, and other computer-readable media) carrying computer code for implementing any of the methods of the previous aspects of the invention; and a computer program per se for implementing any of the methods of the previous aspects of the invention.

Further aspects of the present invention also provide apparatuses for carrying out the methods of the above aspects.

In particular, these aspects provide an apparatus for processing oscillatory response data from a resonant system, the apparatus including:

a processor which is adapted to:
receive measurement data relating to an oscillatory response of the system at a plurality of evenly spaced time intervals;
obtain a plurality of reference frequencies from said data at a plurality of times in said data; and
transform said data to an uneven data set having unevenly spaced time intervals by adjusting said evenly spaced time intervals according to the values of said measured reference frequencies.

Preferably the transformed data set is substantially or effectively stationary with respect to one mode of the system and thus in a more useful form for further analysis.

The apparatus preferably includes a sensor for measuring an oscillatory response of the system, wherein said processor is adapted to receive said measurement data from the sensor.

The processor may be implemented in dedicated hardware, or it may be a suitably programmed computer.

Preferred or optional features of the methods of the previous aspects may be embodied in corresponding preferred or optional features of the apparatus of this aspect.

Embodiments of the present invention will now be described in relation to the accompanying drawings, in which.

GENERAL THEORY

A general theory of the embodiments of the present invention is set out below.

Consider an evenly sampled signal $s(t_k)$ defined for N points. With no loss of generality we can consider the first point to occur at an instant in time which we define as zero. Then, if the sampling interval is dt, the second point defines the value of the signal at dt, the third point at 2.dt, etc. so we have $t_{k+1}=t_k+dt$, and given the arbitrarily set zero-start-time, $t_k=(k-1).dt$.

The data series is defined by amplitudes $s_1, s_2, s_3 \ldots, s_{N-1}, s_N$ with each value occurring or defined at its respective time; i.e. $s_k$ occurs at $t_k$. The total time period over which the signal is sampled and defined is $(N-1).dt$.

All embodiments include a transformation of the original series which results in an unevenly spaced series, $s_u^T$, which is defined as follows:

$s_u^T(t)$ is defined by $$s_k^T = s_k \text{ for all } k \qquad \text{Equation (1)}$$

with the uneven time interval between each point (which is now also a function of time) being defined in accordance with $$dt_u^T(t) = dt \cdot [f_r(t)/f_c] \qquad \text{Equation (2)}$$

where $f_r(t)$ is a reference frequency, and $f_c$ is a constant. The constant may be set to any value, and therefore for the embodiments considered here will be set to unity. As a result, the time corresponding to the occurrence of $s_k^T$ is set to $$t_k^T = t_{k-1}^T + dt_u^T(t_k) \qquad \text{Equation (3)}$$

and $$t_N^T = \Sigma dt_u^T(t_k) \qquad \text{Equation (4)}$$

where the summation is over all $(N-1)$ uneven time intervals.

Figure 1A:
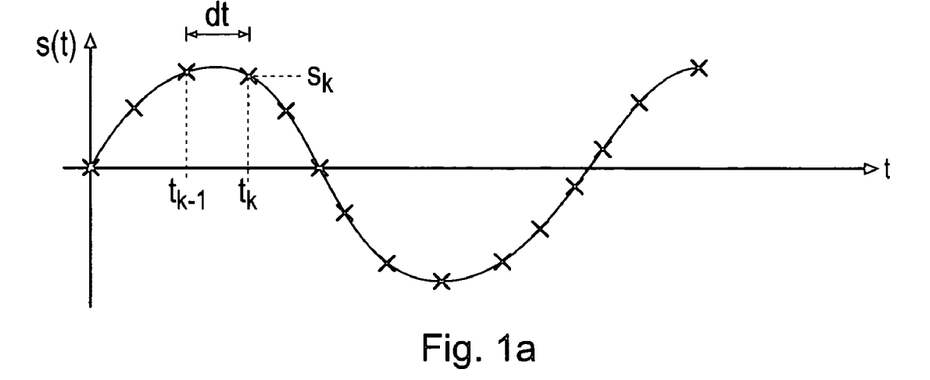
FIGS. 1a, 1b and 1c show a general transformation from a fixed time interval series to a variable time interval series.
Figure 1B:
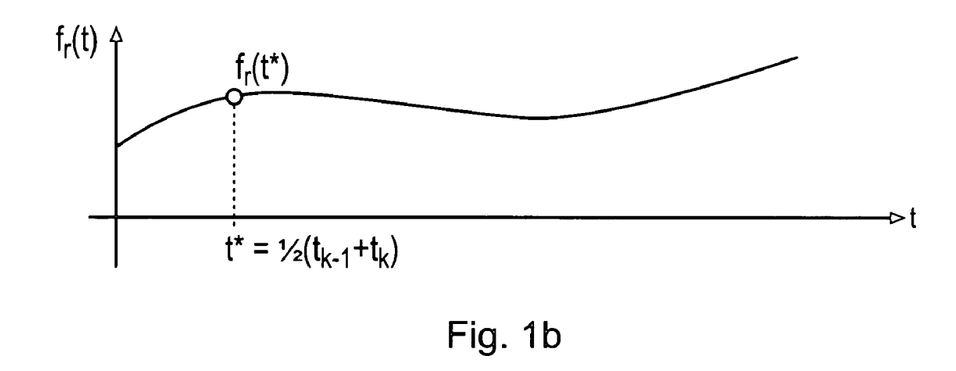
Figure 1C:
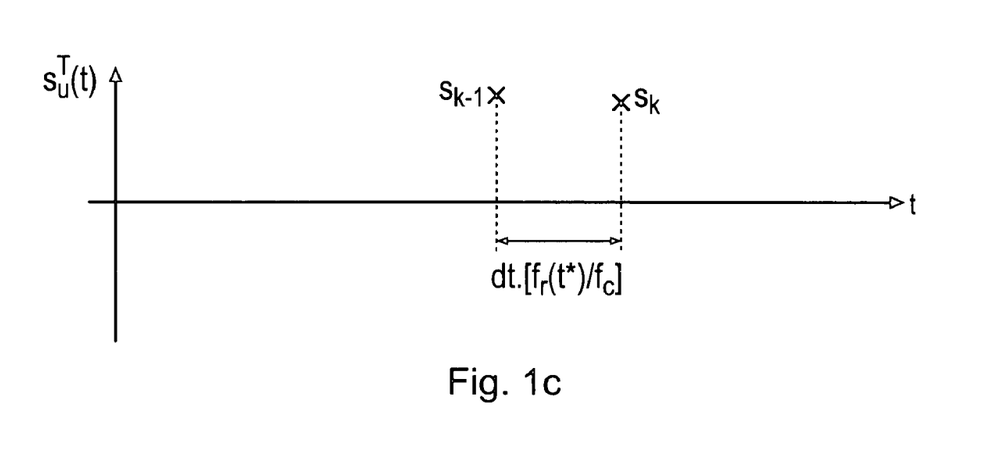

The above process is illustrated schematically in FIGS. 1a, 1b, & 1c by considering two data points at times $t_{k-1}$ and $t_k$ with respective signal values of $s_{k-1}$ and $s_k$. The reference frequency at time t* is used to scale the time interval dt. Here, $t^* = \frac{1}{2}(t_k + t_{k-1})$.

The uneven data set may now be processed directly, e.g. to estimate the spectrum (using techniques for uneven data series) and thence the damping or may be resampled to an evenly spaced data set ($s_e^T$) in order to allow standard signal processing algorithms to be used.

$s_e^T(t)$ is computed by resampling $s_u^T(t)$ using an interpolation algorithm. A number of interpolation approaches are possible; e.g. linear, cubic or higher order B-spline, etc. In resampling, the number of data points (M) may be chosen to be equal to or different to N.

$s_e^T(t)$ is now defined at evenly spaced intervals of time such that:

$$dt_e^T \cdot (M-1) \cong t_N^T \qquad \text{Equation (5)}$$

The resulting signals $s_u^T(t)$ and or $s_e^T(t)$ may be further processed in a manner appropriate to the application.

Note that the selection of the constant $f_c$ is arbitrary and in all the example cases considered here, is set equal to 1.

In the case of a mechanical system with varying natural frequencies and subject to random excitation, the above method can be used to transform the data so that it is effectively stationary in respect of one of the modes of vibration and thus enable its damping to be assessed. Specifically, at those (time varying) frequencies where the response is dominated by the mode to be identified, then the transformation maps those frequency components to a time invariant set in a manner that sets the correct frequency separation between components to enable the modal bandwidth and damping to be assessed. This is demonstrated below.

In the cases considered here the reference frequency $\{f_r(t)\}$ is an estimate of the natural frequency $\{f_n(t)\}$ of the mode to be identified.

The natural frequency profile may be estimated via a number of different available techniques.

For example the techniques may be based on the Campbell diagram/plot (also commonly known as the Waterfall or ZMOD plot). These plots show the spectral distribution of vibration and how this changes with time resulting from having computed multiple short-time averaged Fourier spectra. A method for estimating natural frequency from this data is described in "The automatic interpretation of vibration data from gas turbines", Allwood, King, & Pitts, *The Aeronautical Journal of the Royal Aeronautical Society*, March 1996.

Alternatively to the methods described in this reference, the same zmod data containing the multiple Fourier transform data may be analysed to determine likely natural frequency values via a standard modal curve fitting approach and or manually cursoring likely estimates prior to conducting a least squares type fit to the data to determine a smooth time frequency profile.

In another approach, the natural frequency profile may be obtained by calculating the "instantaneous" frequency of the response, for example by computing the time between successive zero-point crossings, which are taken to represent half periods of the response. From the zero crossing points, a time-varying data set of separations can be obtained. This can be translated to a time-varying data set of instantaneous frequencies ($f_i = \frac{1}{2}t_i$). If the response is not dominated by a single mode, this approach may require pre-processing of the response by first bandpass filtering the data around the mode to be identified.

Alternatively, local curve fitting analysis can be used to compute the "instantaneous" frequency and its variation. For example a sinusoidal function (in the interval $[0, \pi]$ which describes a half cycle) may be fitted to all data points between consecutive zero-crossing points. This fitting is repeated for all points to give the frequency profile. Again, if the response is not dominated by a single mode, this approach may require pre-processing of the response by first bandpass filtering the data around the mode to be identified.

The frequency data thus obtained may be filtered. A running average of the instantaneous frequency or a curve fitting process may then be used to estimate the variation of the natural frequency of the mode over the period of the response.

The frequency profile may alternatively be obtained from model data, or from model data in conjunction with experimental data.

The effect of the transformation and how it effectively stationarises the data may be seen from the following considerations. In all cases, the original signal under consideration is considered to be discrete with a sampling time interval of dt.

Letting the mode to be identified have a time varying natural frequency of $f_n(t)$ and a constant damping of Q, we note that the modal (−3 dB) bandwidth $B_n$ will also be time varying, so that $$B_n(t) = f_n(t)/Q \qquad \text{Equation (6)}$$

Consider a signal component which has, at some instant in time $t_1$, a frequency of $f(t_1)$ where $$f(t_1) = f_n(t_1) + \lambda \cdot B_n(t_1) \qquad \text{Equation (7)}$$

where $\lambda$ is a constant.

The period of one cycle of this signal component is $$T(t_1)=1/f(t_1)$$

and this period will be 'spanned' by μ data points such that μ may be a non-integer and the following relationship will be exact:

$$\mu=T(t_1)/dt \qquad \text{Equation (8)}$$

Following the initial transformation to an unevenly spaced data series (using equation 2) to define the new time interval between points, $dt_u^T(t_1)=dt\cdot[f_r(t_1)/f_c]$ However there will still be the same number of data points spanning one period for the frequency component of interest. The period of this component in the transformed data set will be $$T^T(t_1)=\mu \cdot dt_u^T(t_1)$$

Substituting from equations 2 and 8, and setting $f_r(t_1)=f_n(t_1)$ then we have $$T^T(t_1)=\{T(t_1)/dt\}\cdot\{dt\cdot[f_n(t_1)/f_c]\}$$

Replacing periods with frequencies gives $$1/f^T(t_1)=\{1/f(t_1)\}\cdot\{f_n(t_1)/f_c\}$$

re-arranging and substituting for $f(t_1)$ from equation (7)

$$f^T(t_1) = \{f_n(t_1) + \lambda \cdot B_n(t_1)\} \cdot \{f_c / f_n(t_1)\}$$
$$= f_c \cdot \{1 + \lambda \cdot [B_n(t_1)/f_n(t_1)]\}$$

and substituting for Q from equation (6)

$$f^T(t_1)=f_c\cdot\{1+\lambda/Q\} \qquad \text{Equation (9)}$$

Now consider the following three frequency component cases:

1. $\lambda=0, f_1(t_1)=f_n(t_1),$ and $f_1^T(t_1)=f_c$

2. $\lambda=0.5, f_2(t_1)=f_n(t_1)+0.5\cdot B_n(t_1),$ and $f_2^T(t_1)= f_c\cdot\{1+0.5/Q\}$ 3. $\lambda=-0.5, f_3(t_1)=f_n(t_1)-0.5\cdot B_n(t_1),$ and $f_3^T(t_1)= f_c\cdot\{1-0.5/Q\}$ From which we see that the natural frequency gets mapped to the constant and arbitrarily set value of $f_c$ and the frequencies at −3 dB points get mapped to frequencies such that the difference in frequencies in the transformed set:

$$B_n^T = f_2^T(t_1) - f_3^T(t_1)$$
$$= f_c \cdot \{1/Q\}$$

And we see the validity of the computation of damping from the transformed data set based on the ratio $$f_1^T(t_1)/[f_2^T(t_1) - f_3^T(t_1)] = f_c/B_n^T$$
$$= Q$$

We note from this that the transformed natural frequency and modal bandwidth are both time invariant constants which is the desired property of the transformation and may be used to estimate the damping assuming that it remains reasonably constant over the analysis period.

Two computer simulated embodiments of the application of methods of the present invention are presented below. To illustrate the various features, the first embodiment describes a single mode system. The second embodiment demonstrates the process and how it works for a system with more than one mode.

In both embodiments, time history plots shown in the Figures have independent axis values which are the array data point numbers. This is a consequence of the plotting program used and actual simulation time is equal to this data point number multiplied by the simulation time interval.

Following the transformation to uneven data sets, in both embodiments the signals are re-sampled to get evenly sampled data sets prior to computing other functions as a mid-way step to estimating damping; in these particular examples the power spectral density (PSD) functions are computed.

However, it is also possible to compute these types of functions directly from the uneven data set(s), and the present invention encompasses such methods.

EMBODIMENT 1

A single mode system is simulated using a digital computer. The system has a natural frequency which varies linearly in time from 90 Hz at the start of the simulation to 110 Hz at the end. The simulation period is 100 seconds and the time interval between points is 1/5000 second. The system is excited with a broadband random force whose spectral profile is reasonably flat over the modal bandwidth.

Figure 2:
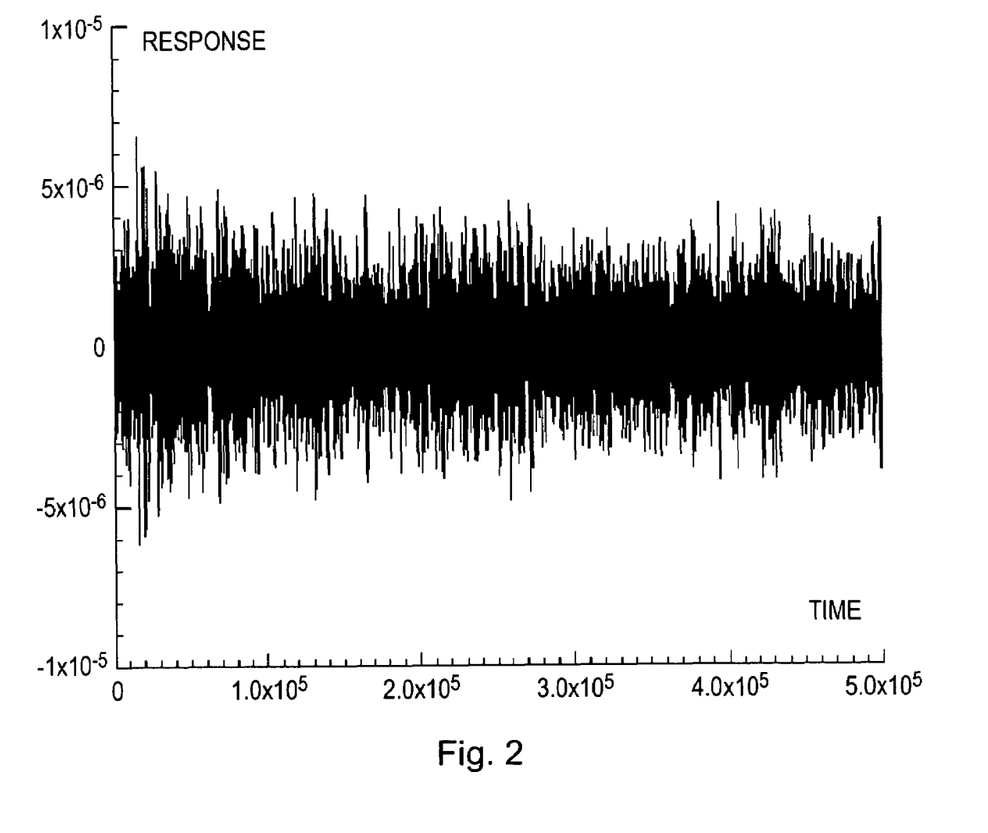
FIG. 2 shows the time domain response of a first model system.
Figure 3:
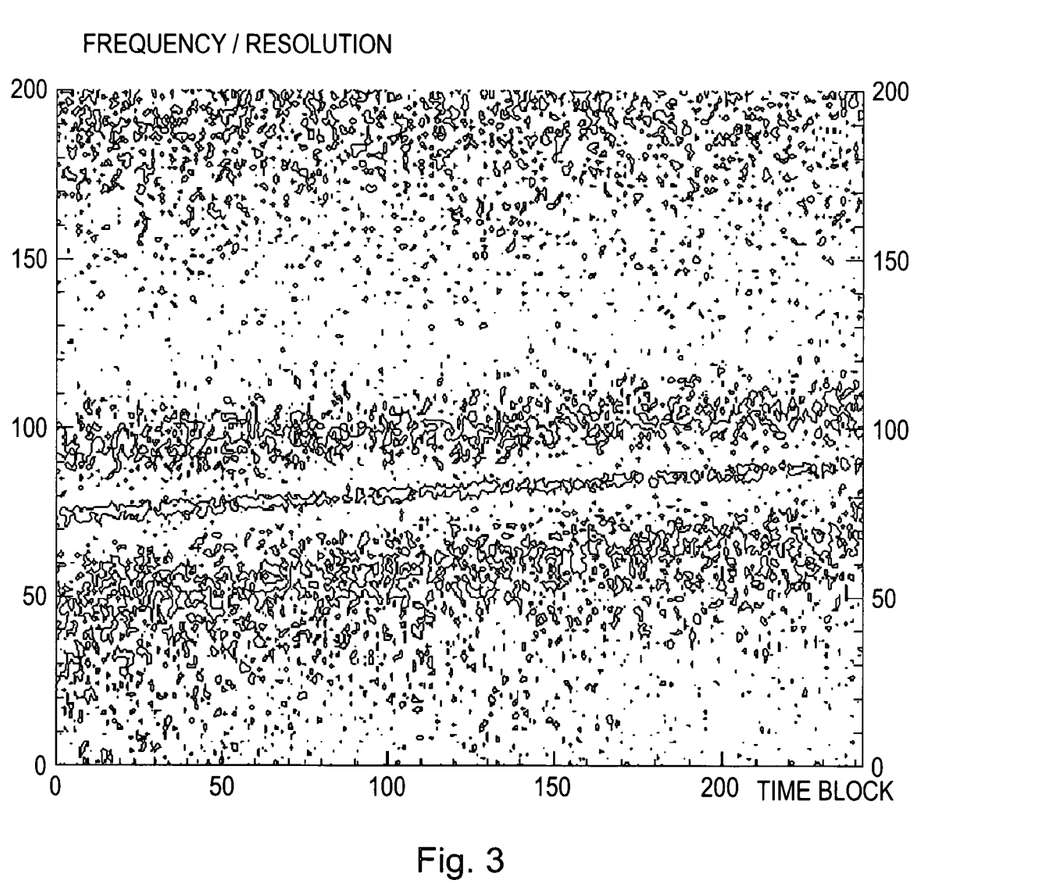
FIG. 3 shows the Campbell or zmod plot of the response of FIG. 2.

The resulting time domain response is shown in FIG. 2. A Campbell plot (also known as a zmod or waterfall plot) showing the frequency distribution of the response and its time variation is shown in FIG. 3; the horizontal axis gives an indication of the time with the values specifying the segment number following segmentation of the data prior to the Fourier Analysis of each segment. If the segment duration is $T_w$ then the Fourier Analysis produces amplitude estimates with a frequency interval or resolution of $1/T_w$; the vertical axis values are equal to the frequency divided by this frequency resolution. All Campbell plots used in the Figures have axes which are defined in this way due to the plotting program being used.

Figure 4:
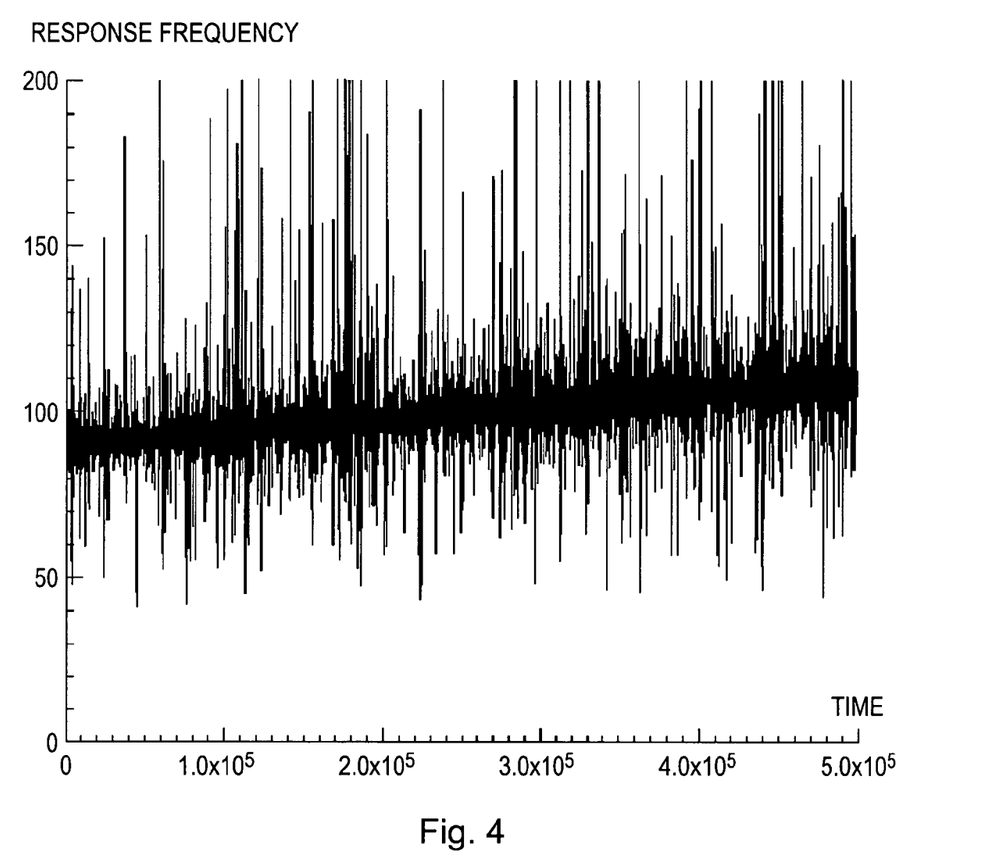
FIG. 4 shows the instantaneous frequency of the response of FIG. 1 over the period of analysis.
Figure 5:
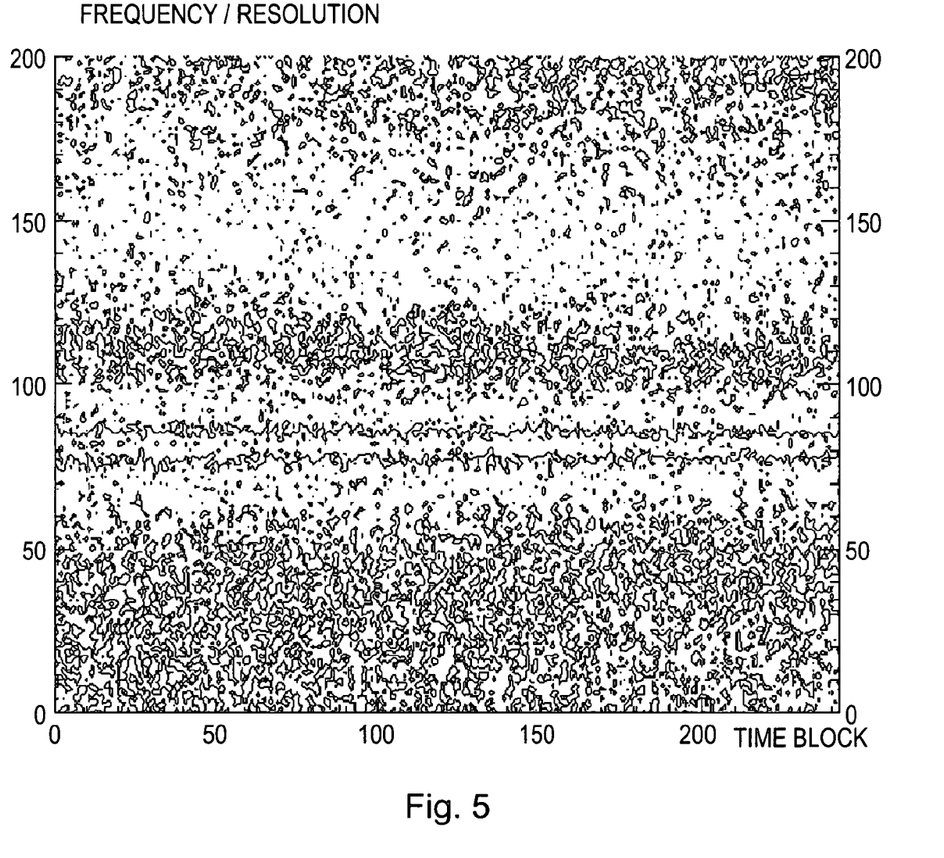
FIG. 5 shows the Campbell or zmod plot of the transformed response signal after processing according to the first embodiment of the present invention has been performed.
Figure 6:
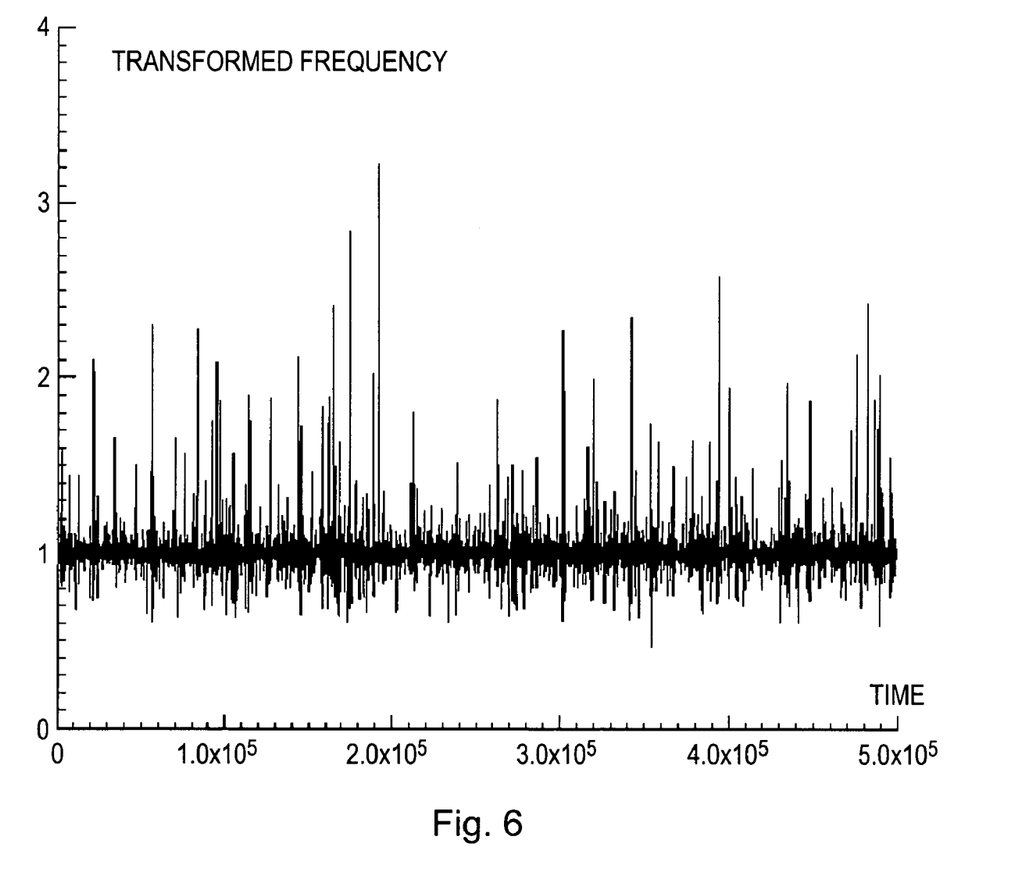
FIG. 6 shows the instantaneous frequency of the transformed response signal after processing according to the first embodiment of the present invention has been performed.
Figure 7:
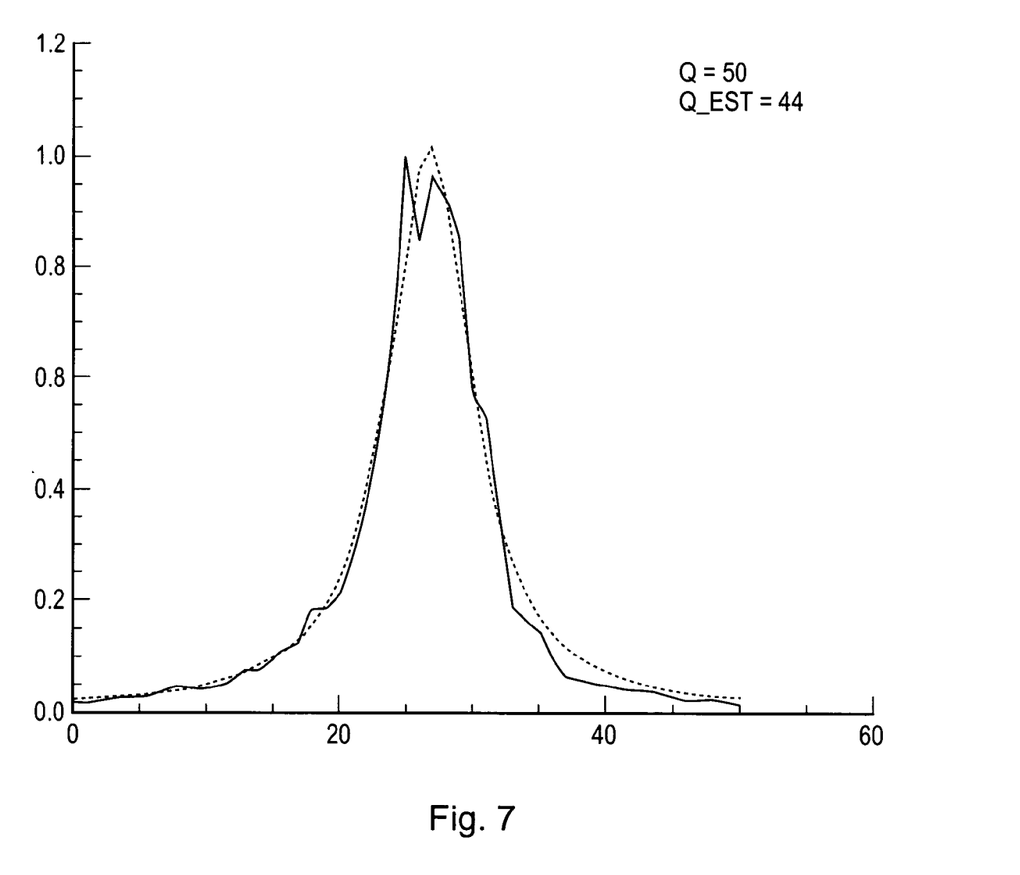
FIG. 7 shows a PSD calculation of the transformed response signal after processing according to the first embodiment of the present invention has been performed.

The instantaneous response frequency assessed by computing zero crossing points and the varying period from cycle to cycle is shown in FIG. 4. FIG. 5 shows a Campbell plot of the transformed response signal which demonstrates the stationarisation of the data with the (natural) frequency of the transformed data at which highest response occurs now appearing to be a time invariant constant. This is further demonstrated by the plot of instantaneous frequency of the transformed response signal shown in FIG. 6. Finally, the transformed signal is further processed by computing its Power Spectral Density (PSD) function and using a single mode modal fit to obtain an estimate of the damping as shown in FIG. 7 (note that the frequency axis values are offset from the true frequencies on this plot).

EMBODIMENT 2

A two mode system is simulated in this second embodiment; the process for dealing with data subject to the influence of more than two modes being readily derivable from this case.

The two modes simulated here have natural frequencies which vary linearly with time. The Q levels are both constants and have the values of 100 and 50 respectively for modes 1 and 2. The natural frequency of mode 1 varies from 90 Hz at the start of the simulation to 110 Hz at the end. The natural frequency of mode 2 varies from 80 Hz at the start of the simulation to 120 Hz at the end. The simulation period is 100 seconds and the time interval between simulation points is 1/2000 second. The system is excited with a broadband random force whose spectral profile is reasonably flat over the modal bandwidths.

Mode 1 is chosen to be identified in this example and the reference frequency is set to approximate to the natural frequency profile of mode 1.

Figure 8:
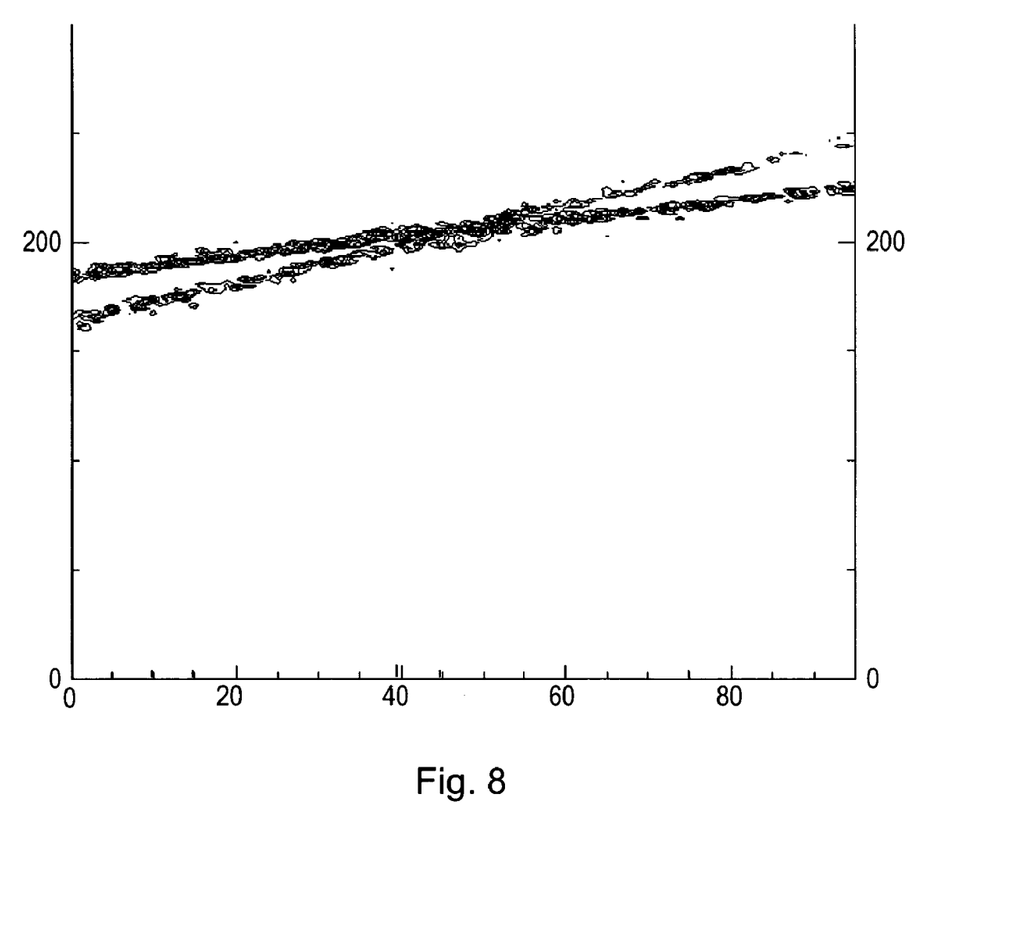
FIG. 8 shows the Campbell or zmod plot of the response of a second model system.
Figure 9:
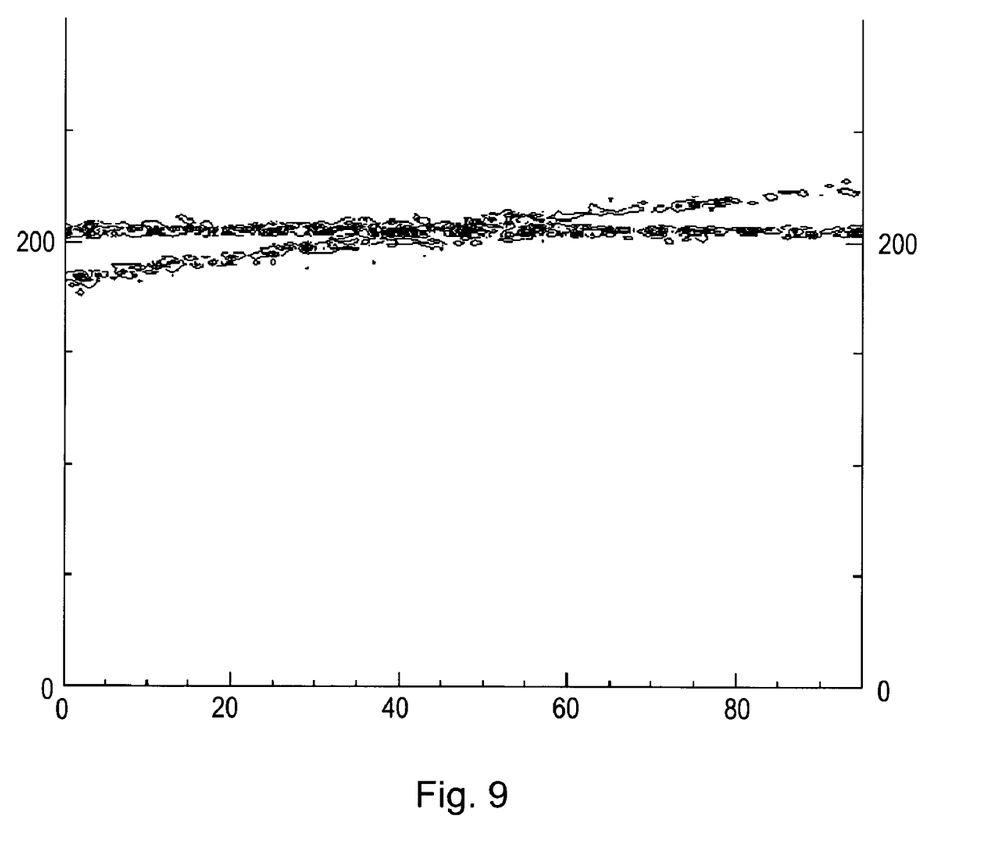
FIG. 9 shows the Campbell or zmod plot of the transformed response signal after processing according to the second embodiment of the present invention has been performed.
Figure 10:
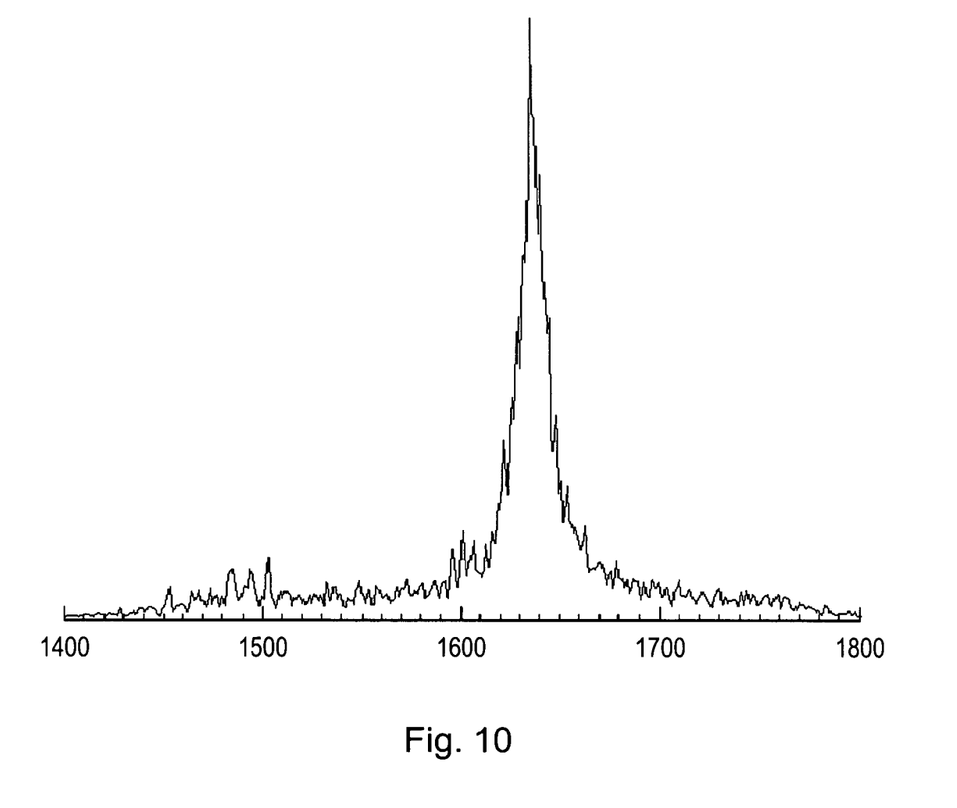
FIG. 10 shows a PSD calculation of the transformed response signal after processing according to the second embodiment of the present invention has been performed.

A Campbell plot showing the frequency distribution of the response and its time variation is shown in FIG. 8. The Campbell plot of the transformed data set is shown FIG. 9, and the PSD of the transformed data is shown in FIG. 10 illustrating the single mode response type characteristics enabling estimation of damping properties; in this case resulting in a Q estimate of 92.

The above example illustrates a general point which is that it is possible to improve estimates by simply ignoring those parts of the signal where the response is not dominated by the mode to be identified. For example, in this case, because of the cross-over of modes near the middle of the simulation period, ignoring roughly $\frac{1}{3}^{rd}$ of the time series near the middle of the simulation would improve the estimates obtained.

The invention claimed is:

1. A method of processing oscillatory response data from a resonant system comprising:
   obtaining data measuring an oscillatory response of the system at a plurality of evenly spaced time intervals;
   obtaining a plurality of reference frequencies from said data at a plurality of times in said data;
   transforming said data to an uneven data set having unevenly spaced time intervals by adjusting said evenly spaced time intervals according to the values of said measured reference frequencies; and
   displaying or storing the uneven data set.

2. A method according to claim 1, wherein each reference frequency is the natural frequency of a mode of the response at the respective time or an estimate of said natural frequency.

3. A method according to claim 1, wherein as many reference frequencies are obtained as there are equally spaced time intervals.

4. A method according to claim 1, wherein said step of transforming includes increasing or decreasing each evenly spaced time interval in proportion to the value of a corresponding one of the reference frequencies.

5. A method according to claim 4, wherein each evenly spaced time interval has a different corresponding reference frequency.

6. A method according to claim 1, further comprising the initial step of measuring the oscillatory response of the resonant system to obtain said data.

7. A method of analysing a resonant system comprising:
   performing the method of claim 1; and
   analysing the uneven data set to determine a characteristic of the system.

8. A method according to claim 7, wherein the step of analysing includes sampling said uneven data set at a plurality of evenly spaced time intervals.

9. A method according to claim 7, wherein the step of analysing includes determining characteristics relating to the bandwidth of a mode of the response.

10. A method according to claim 7, wherein the step of analysing includes determining a power spectral density function.

11. A method according to claim 10, including the step of estimating the damping of the system on the basis of the determined power spectral density function.

12. A method according to claim 11, including the step of determining a change in the damping over time.

13. A method according to claim 1, wherein the system is a model system.

14. A method according to claim 1, wherein the system is a mechanical system.

15. A method according to claim 14, wherein the system is a gas turbine engine or a component thereof.

16. A computer program stored on an information storage medium, when executed, causing a computer to implement the method of claim 1.

17. A computer system configured to implement the method of claim 1.

18. An apparatus for processing oscillatory response data from a resonant system, the apparatus including:
   a processor which is configured to:
   receive measurement data relating to an oscillatory response of the system at a plurality of evenly spaced time intervals;
   obtain a plurality of reference frequencies from said data at a plurality of times in said data; and
   transform said data to an uneven data set having unevenly spaced time intervals by adjusting said evenly spaced time intervals according to the values of said measured reference frequencies.

19. An apparatus according to claim 18, further including a sensor for measuring an oscillatory response of the system, wherein said processor is configured to receive said measurement data from the sensor.

20. An apparatus according to claim 18, wherein the oscillatory system is a mechanical system.

21. An apparatus according to claim 20, wherein the mechanical system is a gas turbine engine or a component thereof.

22. An apparatus according to claim 18, wherein the system is a model system, and the processor is part of a computer.

* * * * *